United States Patent
Kweon et al.

(10) Patent No.: US 10,462,793 B2
(45) Date of Patent: Oct. 29, 2019

(54) METHOD AND APPARATUS FOR CONTROLLING UPLINK DATA TRANSMISSION IN WIRELESS COMMUNICATION SYSTEM

(71) Applicant: Samsung Electronics Co., Ltd, Gyeonggi-do (KR)

(72) Inventors: Ki-Suk Kweon, Gyeonggi-do (KR); Han-Na Lim, Gyeonggi-do (KR); Jung-Shin Park, Seoul (KR); Joo-Hyung Lee, Gyeonggi-do (KR); Ji-Cheol Lee, Gyeonggi-do (KR); Jin-Sung Lee, Seoul (KR); Hyung-Ho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 5 days.

(21) Appl. No.: 15/338,299

(22) Filed: Oct. 28, 2016

(65) Prior Publication Data
US 2017/0127402 A1    May 4, 2017

(30) Foreign Application Priority Data
Oct. 30, 2015    (KR) .......................... 10-2015-0152360

(51) Int. Cl.
*H04L 12/26* (2006.01)
*H04W 72/04* (2009.01)
*H04W 72/08* (2009.01)

(52) U.S. Cl.
CPC ..... *H04W 72/048* (2013.01); *H04W 72/0486* (2013.01); *H04W 72/085* (2013.01)

(58) Field of Classification Search
USPC .... 370/229, 230, 230.1, 232, 235, 241, 252, 370/253, 328, 330, 345
See application file for complete search history.

(56) References Cited

U.S. PATENT DOCUMENTS

| | | | | |
|---|---|---|---|---|
| 6,415,410 | B1 * | 7/2002 | Kanerva | H04L 1/0002 714/749 |
| 7,801,044 | B2 * | 9/2010 | Moutarlier | H04L 69/163 370/230 |
| 8,565,242 | B2 * | 10/2013 | Wu | H04L 47/10 370/232 |
| 2004/0184475 | A1 * | 9/2004 | Meier | H04W 28/14 370/449 |
| 2005/0083850 | A1 * | 4/2005 | Sin | H04L 47/14 370/252 |
| 2005/0243718 | A1 * | 11/2005 | Coupechoux | H04W 99/00 370/229 |

(Continued)

*Primary Examiner* — Kwang B Yao
*Assistant Examiner* — Nguyen H Ngo

(57) ABSTRACT

The present disclosure relates 5G or pre-5G communication systems for supporting higher data transmission rate than those by LTE or other post-4G communication systems. Disclosed are a method and apparatus for determining a window size in a wireless communication system. The method includes determining an uplink data rate of the UE on a wireless link, determining that a maximum data size transmittable through an internet session including the wireless link is the window size for the internet session based on the uplink data rate, and transmitting uplink data through the internet session based on the determined window size.

18 Claims, 7 Drawing Sheets

(56) References Cited

U.S. PATENT DOCUMENTS

| | | | | |
|---|---|---|---|---|
| 2007/0268861 | A1* | 11/2007 | Diachina | H04L 1/1838 370/329 |
| 2008/0037420 | A1* | 2/2008 | Tang | H04L 1/1607 370/229 |
| 2008/0225728 | A1* | 9/2008 | Plamondon | H04L 47/10 370/237 |
| 2008/0253301 | A1* | 10/2008 | Keromytis | H04L 41/0896 370/252 |
| 2009/0154353 | A1* | 6/2009 | Loiacono | H04L 47/14 370/235 |
| 2010/0260049 | A1* | 10/2010 | Racz | H04L 1/187 370/235 |
| 2011/0087944 | A1* | 4/2011 | Li | H04L 1/0015 714/748 |
| 2011/0296064 | A1* | 12/2011 | Ehsan | H04L 47/263 710/57 |
| 2013/0003598 | A1* | 1/2013 | Tanaka | H04W 24/08 370/253 |
| 2014/0247801 | A1* | 9/2014 | Oizumi | H04L 5/0037 370/329 |
| 2014/0314175 | A1* | 10/2014 | Nilsson | H04B 1/0475 375/295 |
| 2015/0236966 | A1 | 8/2015 | Francini et al. | |
| 2015/0271083 | A1* | 9/2015 | Kanamarlapudi | H04L 47/27 370/242 |
| 2016/0182383 | A1* | 6/2016 | Pedersen | H04L 45/24 709/226 |
| 2018/0054757 | A1* | 2/2018 | Nanri | H04W 28/06 |

\* cited by examiner

METHOD AND APPARATUS FOR CONTROLLING UPLINK DATA TRANSMISSION IN WIRELESS COMMUNICATION SYSTEM

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Oct. 30, 2015 and assigned Serial No. 10-2015-0152360, the entire disclosure of which is incorporated herein by reference.

TECHNICAL FIELD

The present disclosure concerns methods and apparatuses for controlling uplink (UL) data transmission in wireless communication systems.

BACKGROUND

In order to meet the demand for wireless data traffic soaring since the 4G communication system came to the market, there are ongoing efforts to develop enhanced 5G communication systems or pre-5G communication systems. For the reasons, the 5G communication system or pre-5G communication system is called the beyond 4G network communication system or post long term evolution (LTE) system.

For higher data transmit rates, 5G communication systems are considered to be implemented on ultra-high frequency bands (mmWave), such as, e.g., a 60 GHz band. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

As wireless communication technology evolves, more and more folks happen to use mobile personal broadcast services. One using a wireless terminal for a mobile personal broadcast service may broadcast, in real-time, images captured by the camera of the wireless terminal. Transmission of image data may utilize the transmission control protocol (TCP) like a typical Internet service does.

For such a mobile personal broadcast service, the wireless terminal steadily sends images being captured to a broadcast server on uplink (UL). By the nature of the broadcast service, real-time image transmission is of critical importance, and continuous data transmission may cause excessive battery consumption in the wireless terminal. Thus, a need exists for technology for reducing battery consumption in a wireless terminal while the wireless terminal provides broadcast services.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a method and apparatus for controlling data transmission in a wireless communication system.

According to the present disclosure, there are provided a method and apparatus for controlling a terminal's uplink transmission in a wireless communication system.

According to the present disclosure, there are provided a method and apparatus for determining an initial window value for Internet transmission on uplink (UL).

According to the present disclosure, there are provided a method and apparatus for adjusting an initial window value for Internet transmission considering a terminal's uplink data rate.

According to the present disclosure, there are provided a method and apparatus for reducing power consumed upon uplink data transmission by addressing a UL data rate slowdown due to an Internet rate limitation.

According to an embodiment of the present disclosure, a method for determining a window size in a wireless communication system comprises determining an uplink data rate of the UE on a wireless link, determining that a maximum data size transmittable through an internet session including the wireless link is the window size for the internet session based on the uplink data rate, and transmitting uplink data through the internet session based on the determined window size.

According to an embodiment of the present disclosure, an apparatus in a user equipment (UE) for determining a window size in a wireless communication system comprises a controller determining an uplink data rate of the UE on a wireless link and determining that a maximum data size transmittable through an internet session including the wireless link is the window size for the internet session based on the uplink data rate, and a transmitter transmitting uplink data through the internet session based on the determined window size.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

It should be noted that the same or similar reference denotations may be used to refer to the same or similar elements, features, or structures throughout the drawings.

DETAILED DESCRIPTION

Figure 1:
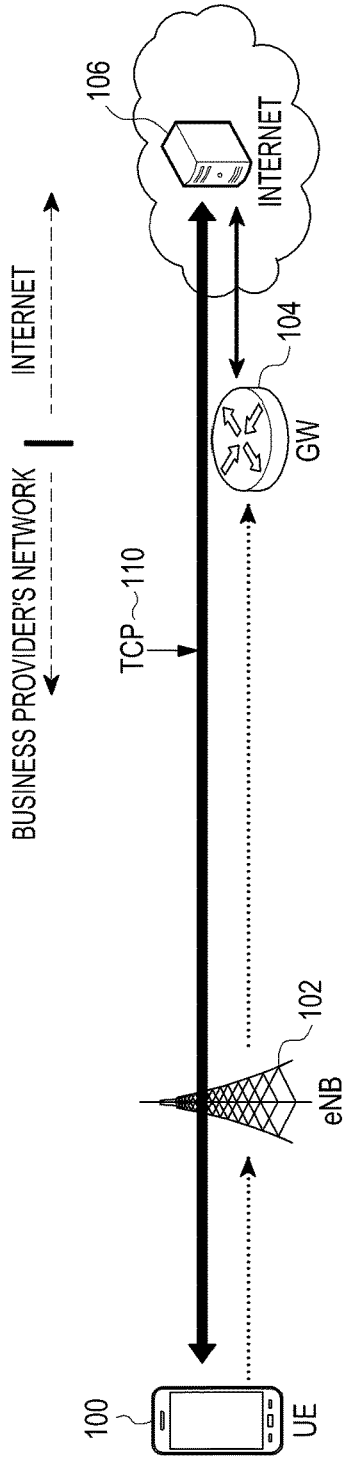
FIG. 1 illustrates a linkage between a user equipment ("UE") and a server in a wireless communication system according to an embodiment of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, embodiments of the present disclosure are described in detail with reference to the accompanying drawings.

In describing the embodiments, the description of technologies that are known in the art and are not directly related to the present disclosure is omitted. This is for further clarifying the gist of the present disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the present disclosure, and methods for achieving the same may be understood through the embodiments to be described below taken in conjunction with the accompanying drawings. However, the present disclosure is not limited to the embodiments disclosed herein, and various changes may be made thereto. The embodiments disclosed herein are provided only to inform one of ordinary skilled in the art of the category of the present disclosure. The present disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more CPUs in a device or a security multimedia card.

Although the description of embodiments herein focuses primarily on evolved packet system (EPS)/LTE-based cellular wireless communication systems, the subject matter of the present disclosure may also be applicable to other communication systems or services having similar technical backgrounds without departing from the scope of the present disclosure, and this may be determined by one of ordinary skill in the art.

FIG. 1 illustrates a linkage between a terminal and a server in a wireless communication system. Here, a transmission control protocol (TCP) session is illustrated as an example of an Internet link.

Referring to FIG. 1, the wireless communication system includes a terminal (also referred to herein as a "user equipment" or simply as a "UE") 100, a base station (also referred to herein as an "evolved Node B or simply as an "eNB") 102, a gateway (GW) 104 in a business provider's network (or an operator network), and a server 106. Here, the server 106 may connect with the service provider's network through the Internet.

The UE 100 establishes a TCP session 110 with the server 106 for transmission of a personal broadcast service. The TCP is an end-to-end protocol. The amount of data that may be simultaneously transmitted using the TCP is termed a "window size." TCP-related settings including the window size are made on an end, such as the UE 100 or server 106. When the UE 100 sends image data to the server 106, the UE 100 may control TCP-related parameters including the window size.

Figure 2:
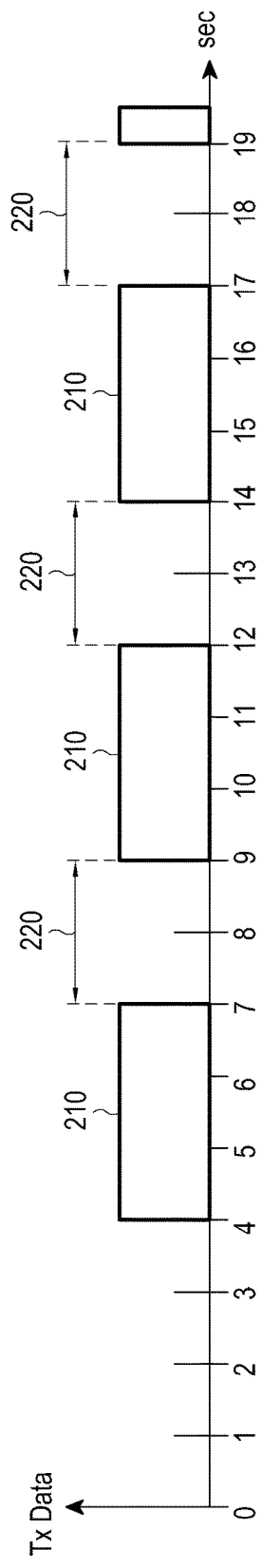
FIG. 2 illustrates a UE's periodic uplink data transmission according to an embodiment of the present disclosure.

FIG. 2 illustrates a UE's periodic uplink data transmission according to an embodiment of the present disclosure.

Referring to FIG. 2, a UE, specifically, a personal broadcast application (hereinafter, simply referred to as a UE) installed on the UE, may send uplink data (i.e., broadcast image data) intermittently rather than continuously. Specifically, the UE may send uplink data for a predetermined time 210 and may then have an idle time in the remaining time 220 during which no data is transmitted, reducing battery consumption.

In the example illustrated, the UE may send image data captured by the user for three seconds 210, then have an idle period 220 of two seconds, and then resume transmission for three seconds 210. The UE may repeatedly perform such operation. During the two-second idle time 220, the UE may expect a battery saving for transmission.

However, actual image data transmission by the personal broadcast application does not show such transmission traffic form as shown in FIG. 1.

As mentioned above, the UE may utilize the TCP as a transmission protocol for personal broadcast service. The TCP makes use of a congestion window (CWND)-based mechanism in order to control data transmission. As an example, a TCP sender, because of being unaware of the communication state he uses upon initial data transmission, sends a tiny amount of data (i.e., an initial CWND) to a receiver, and based on a response from the receiver, then gradually increases the amount of data (i.e., a CWND size) subject to transmission. In other words, the UE sets a small value to the initial CWND and initiates to send data based on the initial CWND.

Since the initial CWND is determined according to the typical TCP that is based on a wired network, the initial CWND may be set to be significantly small as compared with the maximum speed that the UE may use in the wireless communication system. Further, the CWND size, starting with the initial CWND, increases based on an acknowledge (ACK) with which the receiver responds to the data transmission, causing the CWND size slow to increase. For that reason, a delay occurs when the CWND size increases up to the maximum data rate that the UE may use on uplink. The slowdown in responding speed causes a delay until a variation in channel quality is reflected to actual communication.

Figure 3:
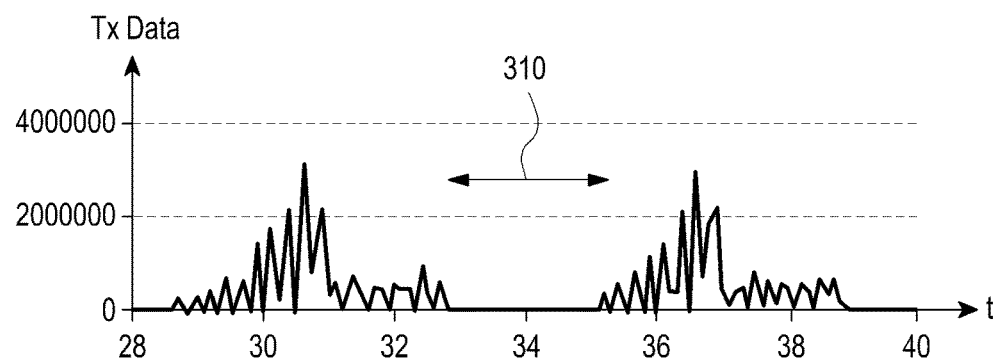
FIG. 3 illustrates an example of actual uplink data transmission by a UE according to an embodiment of the present disclosure.

FIG. 3 illustrates an example of actual uplink data transmission by a UE according to an embodiment of the present disclosure.

Referring to FIG. 3, the UE establishes a TCP session for uplink data transmission and sends broadcast image data captured by a personal broadcast application through the TCP session. Since the initial CWND of the TCP session is set as a small value as compared with an uplink data rate actually available to the UE, it takes about 2.5 seconds or more until the CWND size increases to the UE's maximum data rate. In other words, the UE sends broadcast image data actually for three seconds to four seconds although sending the data has been expected to take three seconds as shown in FIG. 2. This may result in the idle period 310 during which a battery saving is expected being reduced to two seconds or less.

When an idle period when the UE sends no data occurs by a particular time or more, the TCP shrinks the CWND size to the initial CWND, i.e., a smaller value. That is, when the UE sends uplink data after the idle time, another delay occurs in increasing the CWND size until the UE arrives at the maximum uplink data rate. As such, when data rate fails to rapidly increase due to the low initial CWND and ACK-based window control, a lower-speed period occurs in the UE's uplink data transmission.

Figure 4A:
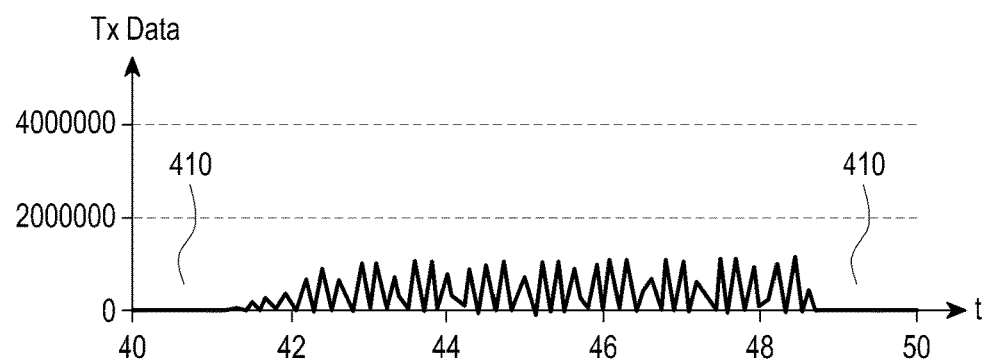
FIGS. 4a and 4b illustrate examples of malfunctioning uplink data transmission by a UE according to an embodiment of the present disclosure.
Figure 4B:
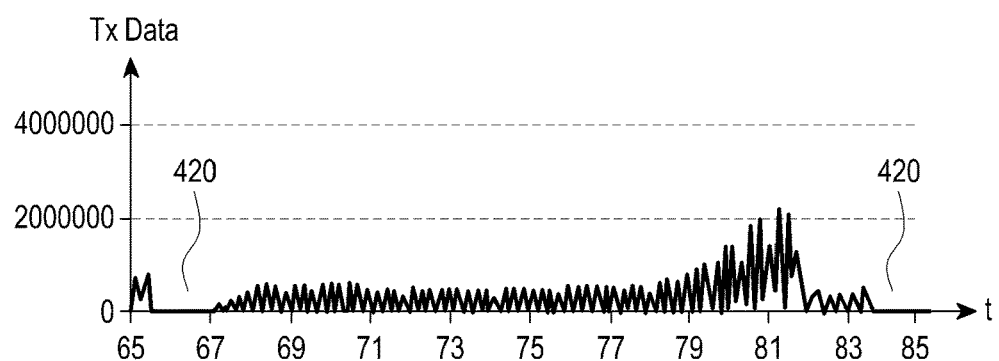

FIGS. 4a and 4b illustrate examples of malfunctioning uplink data transmission by a UE according to an embodiment of the present disclosure.

Referring to FIG. 4a, although the UE's personal broadcast application sends broadcast image data for three seconds after having an idle period for two seconds, the broadcast image data is transmitted indeed without an idle period for eight seconds due to the TCP slowdown.

Referring to FIG. 4b, although the UE's personal broadcast application sends broadcast image data for three seconds after an idle period of two seconds, the UE's uplink data transmission is performed actually for 17 seconds likewise due to the TCP slowdown and has a very short idle period, two seconds, thus rendering the UE substantially impossible to save battery consumption.

According to following embodiments, power consumed upon the UE's uplink data transmission may be reduced by addressing a UL data rate slowdown due to a limited Internet speed.

In the following embodiments, a small initial window size is used when the UE establishes a TCP session, and the CWND size is reduced down to the initial window size in an idle mode where the UE does not send data, so that a possible uplink transmission slowdown issue may be addressed, saving power consumption upon the UE's uplink data transmission. In other words, the UE is rendered to complete uplink data transmission within a short time using a CWND size set to reflect the radio channel state, thereby reducing power consumption due to data transmission.

In the embodiments below, the UE determines a window size (CWND) for controlling TCP transmission based on uplink radio channel information.

Figure 5:
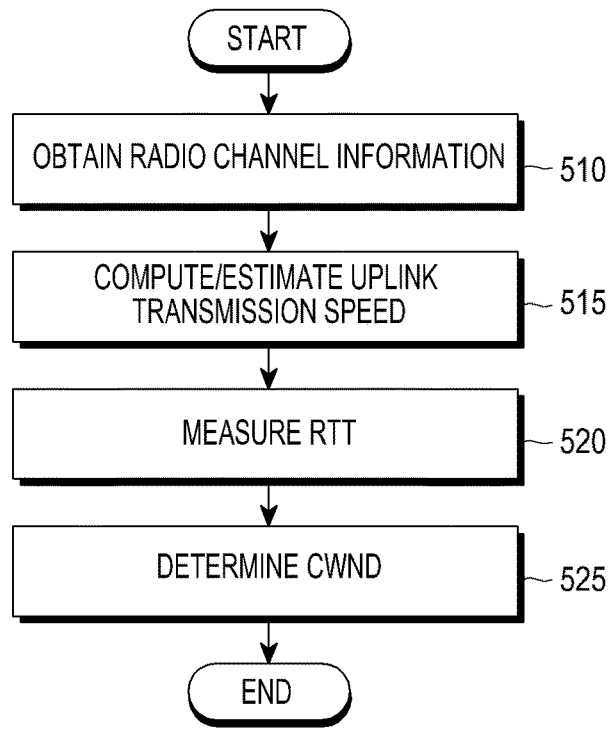
FIG. 5 illustrates an operation of controlling data transmission according to an embodiment of the present disclosure.

FIG. 5 illustrates an operation of controlling data transmission according to an embodiment of the present disclosure.

Referring to FIG. 5, in operation 510, the UE obtains, gathers, or identifies radio channel information. The radio channel information may be information available in computing or estimating an uplink data rate and may be obtained through, e.g., resource allocation by an eNB, measurement on uplink, or measurement on downlink. According to an embodiment of the present disclosure, the radio channel information may include information regarding at least one of a modulation and coding scheme (MCS), the number of resource blocks (also referred to herein as radio blocks) (nRB), and channel quality indication (CQI) as received from the eNB. According to an embodiment of the present disclosure, the radio channel information may include at least one of pieces of measurement information on a reception signal, i.e., reference signal received power (RSRP) and reference signal received quality (RSRQ).

In operation 515, the UE calculates or estimates the uplink data rate based on the obtained radio channel information. Alternatively, the UE may calculate a parameter denoting the uplink data rate.

In operation 520, the UE measures a round-trip time (RTT) between the UE and a server which is a destination to which uplink data is to be sent. The RTT may be measured by a typical algorithm upon or while establishing a TCP session. According to an embodiment of the present disclosure, the UE may skip the RTT measurement.

In operation 524, the UE calculates a window size, i.e., CWND, for use in uplink data transmission on the TCP session based on the gathered pieces of information, i.e., uplink data rate and RTT. According to an embodiment of the present disclosure, the UE may determine that a maximum data size transmittable on uplink, as calculated considering the uplink data rate on the radio channel, is the CWND.

The CWND is applied to uplink data transmission between the UE and the server. Specifically, the UE sends as much data as the CWND through the TCP session. The CWND may gradually be increased or adjusted during the TCP communication.

According to an embodiment of the present disclosure, the determination of the CWND as shown in FIG. 5 may be carried out periodically or under a predetermined triggering condition while the TCP session is maintained.

Now described are various embodiments for the UE to calculate the CWND.

Figure 6:
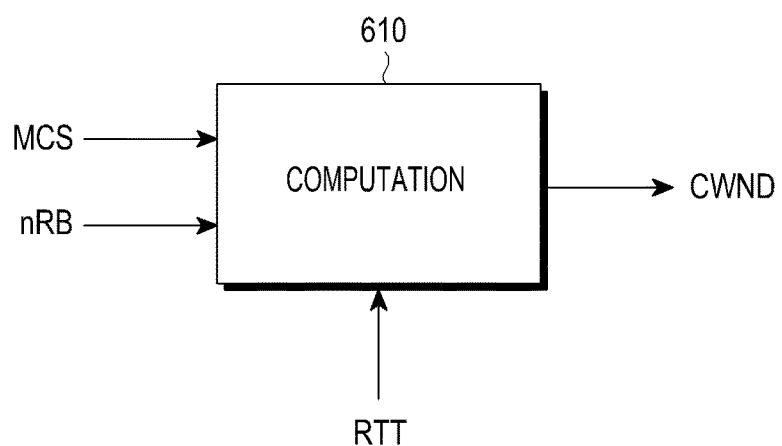
FIG. 6 illustrates an operation of determining a CWND based on an uplink data rate calculated according to an embodiment of the present disclosure.

FIG. 6 illustrates an operation of determining a CWND based on an uplink data rate calculated according to an embodiment of the present disclosure.

Referring to FIG. 6, a computing block 610 calculates a CWND based on an MCS and nRB assigned from an eNB. The computing block 610 shown is merely an example, and the block 610 may be a functional block included in a transport layer of the UE sending broadcast image data generated by the personal broadcast application to a server. As an example, for an Android operating system (OS)-equipped UE, the computing block 610 may be implemented as an application processor (AP) and may obtain information necessary to calculate the CWND from a modem which may be implemented as a communication processor (CP).

When the modem of the UE receives allocation information regarding the MCS and nRB from the eNB, the computing block 610 calculates an uplink data rate based on the MCS and nRB transferred from the modem and determines the CWND based on the uplink data rate. The information regarding the MCS and nRB is included in the allocation information transmitted from the eNB to the UE as the UE requests to allocate resources for uplink data transmission.

When the uplink data rate is calculated based on the MCS and nRB, the computing block 610 determines the CWND based on a RTT measured between the server and the UE. The computing block 610 may calculate the UE's uplink data rate, i.e., the amount of data that the UE may send, through the MCS and nRB. The operation suggested is used, e.g., to determine the CWND when the UE creates a TCP session or to determine the CWND when starting data transmission after a data transmission idle mode.

The computing block 610 produces a transport block size (TBS) which denotes the amount of data transmittable according to the MCS and nRB.

Specifically, the computing block 610 identifies a TBS index corresponding to the MCS and maps the nRB assigned from the eNB to the TBS index to determine the TBS. The TBS is used as an uplink data rate. According to an embodiment of the present disclosure, an algorithm determining a TBS for a LTE system may be used to determine the TBS.

Table 1 below represents an example of mapping modulation order to MCS index with TBS index. The computing block 610 may identify a TBS index corresponding to a MCS allocated by the eNB based on a mapping table such as Table 1.

TABLE 1

| MCS Index | Modulation Order | TBS Index |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |

TABLE 1-continued

| MCS Index | Modulation Order | TBS Index |
|---|---|---|
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

Table 2 below represents examples of TBS index-mapped per-nRB TBSs. The computing block 610 may identify a TBS corresponding to an nRB (1, 2, ..., 10) allocated by the eNB and the TBS index based on a mapping table such as Table 2.

TABLE 2

| TBS Index | Transport block size | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |

The computing block 610 receives a RTT of a TCP session measured by a RTT measuring unit (not shown). The RTT may be measured through a procedure for the UE, sender, to establish a TCP session with the server which is the receiver. Further, the RTT may steadily be updated during data communication with the server.

The computing block 610 determines a CWND based on the calculated TBS and RTT. The following Equation 1 represents an example of an algorithm for computing a CWND:

$$CWND = \text{Matrix}\{MCS, nRB\}, MCS > 0,$$
$$nRB > 0 \text{ Matrix}\{MCS, nRB\} = TBS * RTT / MSS \quad \text{Equation 1}$$

As shown in Equation 1, a CWND is determined as a matrix of a MCS and an nRB. The MCS and nRB are values assigned by the eNB which are larger than 0. The CWND determined through the matrix is the product of the TBS and RTT. That is, the computing block 610 determines that the maximum data size transmittable through the TCP session according to the current radio channel circumstance is the CWND. The CWND is represented in unit of maximum segment size (MSS) used in the TCP session. MSS means the maximum segment size of the TCP. A MSS value may be set per communication service provider, and accordingly, a preset MSS value may be used to determine the CWND.

Table 3 below represents CWND values determined by a CWND determining algorithm represented in Equation 1 when RTT=100 ms, and MSS=1380. Examples shown here are for when nRB is 2, 10, 50, and 100.

TABLE 3

| | nRB | | | |
|---|---|---|---|---|
| MCS | 2 | 10 | 50 | 100 |
| 0 | 2 | 19 | 100 | 202 |
| 1 | 4 | 25 | 130 | 263 |
| 2 | 5 | 31 | 161 | 332 |
| 3 | 8 | 41 | 207 | 416 |
| 4 | 9 | 50 | 263 | 523 |
| 5 | 10 | 63 | 318 | 635 |
| 6 | 13 | 75 | 374 | 746 |
| 7 | 16 | 89 | 449 | 885 |
| 8 | 19 | 100 | 505 | 1023 |
| 9 | 21 | 112 | 579 | 1148 |
| 10 | 24 | 126 | 635 | 1273 |
| 11 | 24 | 126 | 635 | 1273 |
| 12 | 27 | 147 | 718 | 1438 |
| 13 | 32 | 165 | 830 | 1661 |
| 14 | 35 | 184 | 939 | 1845 |
| 15 | 40 | 207 | 1023 | 2053 |
| 16 | 43 | 226 | 1106 | 2216 |
| 17 | 46 | 235 | 1190 | 2381 |
| 18 | 50 | 263 | 1329 | 2659 |
| 19 | 56 | 290 | 1438 | 2843 |
| 20 | 61 | 309 | 1550 | 3175 |
| 21 | 61 | 309 | 1550 | 3175 |
| 22 | 66 | 332 | 1661 | 3398 |
| 23 | 72 | 360 | 1845 | 3697 |
| 24 | 77 | 388 | 1984 | 3990 |
| 25 | 82 | 416 | 2053 | 4155 |
| 26 | 86 | 434 | 2216 | 4468 |
| 27 | 91 | 449 | 2297 | 4621 |
| 28 | 107 | 542 | 2659 | 5462 |

According to an embodiment of the present disclosure, in the configuration shown in FIG. 6, the computing block 610 may determine that the CWND is a value previously determined as per the MCS and nRB instead of computing or estimating the uplink data rate according to the MCS and nRB.

In the instant embodiment, the computing block 610 determines that the CWND is a predetermined value as per the MCS and nRB rather than exactly computing or estimating the uplink data rate.

The computing block 610, upon reception of allocation information regarding the MCS and nRB from the modem, outputs a predetermined CWND corresponding to the nRB and the section where the MCS belongs. To that end, the computing block 610 previously stores a mapping rule or table for CWND values corresponding to the MCS and nRB.

Table 4 below represents an example of segmentation of MCSs for determining a CWND.

TABLE 4

| MCS | Method 1 index | Method 2 index | Method 3 modulation order | Method 3 index |
|---|---|---|---|---|
| 0 | 1 | 1 | 2 | 1 |
| 1 | | | 2 | |
| 2 | | | 2 | |
| 3 | | | 2 | |
| 4 | | | 2 | |
| 5 | 2 | | 2 | |
| 6 | | | 2 | |
| 7 | | 2 | 2 | |
| 8 | | | 2 | |
| 9 | | | 2 | |
| 10 | 3 | | 4 | 2 |
| 11 | | | 4 | |
| 12 | | 3 | 4 | |
| 13 | | | 4 | |
| 14 | | | 4 | |
| 15 | 4 | | 4 | |
| 16 | | | 4 | |
| 17 | | 4 | 6 | 3 |
| 18 | | | 6 | |
| 19 | | | 6 | |
| 20 | 5 | | 6 | |
| 21 | | 5 | 6 | |
| 22 | | | 6 | |
| 23 | | | 6 | |
| 24 | | | 6 | |
| 25 | 6 | 6 | 6 | |
| 26 | | | 6 | |
| 27 | | | 6 | |
| 28 | | | 6 | |

The computing block 610 may determine a CWND corresponding to the MCS by any one of methods 1, 2, and 3.

By method 1, the computing block 610 may evenly separate MCS values 0 to 28 at predetermined intervals. In the example shown in Table 4, five MCS values may be determined in one section. Accordingly, the MCS values may be separated into six sections. For example, MCS values (MCS=0, 1, 2, 3, and 4) belong to one section, which is mapped to one CWND (CWND index=1). In Table 4 above, the section with the same CWND is denoted with a CWND index, and an actual CWND corresponding to the CWND index is previously determined. A numeral increasing from section to section as exemplified in Table 4, or a particular character may be used as the CWND index. In the example shown in Table 4, the number of sections is six, and a section interval is five.

In method 1, the section interval, i.e., the number of CWND indexes, may be determined depending on how fine the CWND is adjusted. For example, when the section interval is 4, the number of sections is 8, and the CWND is determined as one of the eight values. When the section interval is 1, the number of sections becomes 29, enabling the CWND to be adjusted more finely.

By method 2, the computing block 610 may separate MCS values 0 to 28 at predetermined intervals. In the example shown in Table 4, although MCSs are separated into six sections, the section intervals might not be even. For example, smaller MCSs have a broader section interval while larger MCSs have a narrower section interval. This is why, upon referring to MCSs determined per MCS and nRB, a smaller MCS has a smaller CWND increment/increment rate than a larger MCS has.

Referring to Table 4, section 1 includes seven MCSs, MCS=0, 1, 2, 3, 4, 5, and 6, and section 4 includes four MCSs, MCS=17, 18, 19, and 20. In other words, smaller MCSs are included in sections with larger section intervals, while larger MCSs are included in sections with smaller section intervals.

By method 3, MCSs are separated into sections according to their modulation orders. Referring to Table 1, MCSs, MCS=0, 1, 2, 3, 4, 5, 6, 7, 8, 9, have a modulation order of 2, MCSs, MCS=10, 11, 12, 13, 14, 15, 16, have a modulation order of 4, and MCSs, MCS=17, 18, 19, 20, 21, 22, 23, 24, 25, 26, 27, 28, have a modulation order of 6. As such, three sections corresponding to three modulation orders come in used, and each section includes MCSs with a modulation order of 2, 4, or 6, and is mapped to the same CWND index.

Table 5 below represents an exemplary mapping table determining a CWND corresponding to a MCS section.

TABLE 5

| | | nRB = 10 | | | |
|---|---|---|---|---|---|
| MCS | index | [Equation 1] | Method 1 | Method 2 | Method 3 |
| 0 | 1 | 19 | 10 | 19 | 19  19 + 6 * 0 |
| 1 | | 25 | | | 25  19 + 6 * 1 |
| 2 | | 31 | | | 31  19 + 6 * 2 |
| 3 | | 41 | | | 37  19 + 6 * 3 |
| 4 | | 50 | | | 43  19 + 6 * 4 |
| 5 | 2 | 63 | 63 | 20 | 63  63 + 10 * 0 |
| 6 | | 75 | | | 73  63 + 10 * 1 |
| 7 | | 89 | | | 83  63 + 10 * 2 |

TABLE 5-continued nRB = 10

| MCS | index | [Equation 1] | Method 1 | Method 2 | | Method 3 |
|---|---|---|---|---|---|---|
| 8  |   | 100 |    |     | 93  | 63 + 10 * 3 |
| 9  |   | 112 |    |     | 103 | 63 + 10 * 4 |
| 10 | 3 | 126 | 30 | 126 | 126 | 126 + 10 * 0 |
| 11 |   | 126 |    |     | 126 | CWND_index3 |
| 12 |   | 147 |    |     | 146 | 126 + 10 * 2 |
| 13 |   | 165 |    |     | 156 | 126 + 10 * 3 |
| 14 |   | 184 |    |     | 166 | 126 + 10 * 4 |
| 15 | 4 | 207 | 40 | 207 | 207 | 207 + 10 * 0 |
| 16 |   | 226 |    |     | 217 | 207 + 10 * 1 |
| 17 |   | 235 |    |     | 227 | 207 + 10 * 2 |
| 18 |   | 263 |    |     | 237 | 207 + 10 * 3 |
| 19 |   | 290 |    |     | 247 | 207 + 10 * 4 |
| 20 | 5 | 309 | 50 | 309 | 309 | 309 + 10 * 0 |
| 21 |   | 309 |    |     | 309 | CWND_index5 |
| 22 |   | 332 |    |     | 329 | 309 + 10 * 2 |
| 23 |   | 360 |    |     | 339 | 309 + 10 * 3 |
| 24 |   | 388 |    |     | 349 | 309 + 10 * 4 |
| 25 | 6 | 416 | 60 | 416 | 416 | 416 + 15 * 0 |
| 26 |   | 434 |    |     | 431 | 416 + 15 * 1 |
| 27 |   | 449 |    |     | 446 | 416 + 15 * 2 |
| 28 |   | 542 |    |     | 461 | 416 + 15 * 3 |

According to an embodiment of the present disclosure, by method 1 of Table 4 and Table 5, a CWND may be determined by multiplying a default CWND with a CWND index. Alternatively, a CWND may be determined by multiplying a default CWND by a multiple of a CWND index. In Table 5, the column of method 1 shows CWNDs determined by multiplying a default CWND by CWND indexes.

By method 2, a CWND may be determined as a CWND value corresponding to the minimum MCS in a corresponding section. For example, when MCS=9, the CWND is determined to be 63. This is for preventing any issue that may occur as the UE sends data exceeding the maximum data rate available through the MCS. That is, when the CWND in the section with a CWND index of 2 is determined to be 89 which corresponds to MCS=8, and the actual MCS is 6 or 7, the UE sending data in excess of the maximum data rate may raise an issue, such as data loss. Further, this may bring up with additional issues, e.g., increases in RTT and power consumption due to data retransmission. Thus, method 2 utilizes the minimum MCS in a corresponding section in determining a CWND.

Meanwhile, when a MCS assigned is the maximum value in a corresponding section, a reduction in power gain may arise as the UE sends data at a data rate (i.e., a CWND corresponding to the minimum MCS in the corresponding section) lower than the maximum data rate. To compensate for this, a weight as per the MCS may be applied to the CWND determined according to the MCS section as shown in Equation 2 below:

$$CWND = CWND\_index\{index\} + (MCS\_current - MCS\_index) * \gamma \quad \text{Equation 2}$$

where CWND_index{index} denotes the reference CWND in each section. Referring to Table 5, CWND_index{2} for section 2 is 63.

MCS_current means the UE's current MCS received by the modem of the UE from the eNB.

MCS_index means the MCS corresponding to the reference CWND in each section. Referring to Table 5, MCS_index for section 2 is 5.

γ means a weight for compensating for the circumstance where CWND_index fails to reflect the uplink data rate of MCS_current. According to an embodiment of the present disclosure, γ may be determined to be a value obtained by dividing the difference between the maximum CWND and the minimum CWND in a corresponding section by the number of MCS included in the section or the number of MCS minus one.

According to an embodiment of the present disclosure, γ may be a predetermined value. According to an embodiment of the present disclosure, γ may be determined so that the CWND does not exceed the maximum data rate corresponding to MCS_current. According to an embodiment of the present disclosure, γ may be determined to be the same or independently per section.

As an example, when MCS=11, the CWND (CWND=136) determined by method 3 cannot exceed the maximum data rate (CWND=126). Under such circumstance, the computing block 610 may use the CWND corresponding to a previous MCS or CWND_index{index}.

Figure 7:
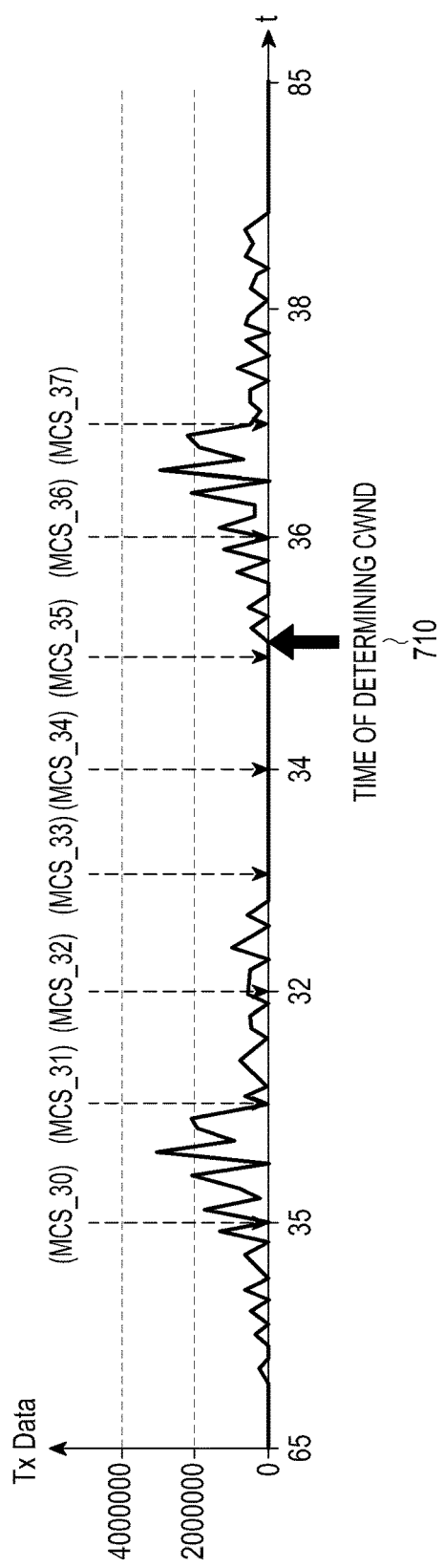
FIG. 7 illustrates a transmission operation upon obtaining radio channel information at predetermined intervals from a modem according to an embodiment of the present disclosure.

FIG. 7 illustrates a transmission operation upon obtaining radio channel information at predetermined intervals from a modem according to an embodiment of the present disclosure. In the example shown, the MCS which is radio channel information is gathered every second.

Referring to FIG. 7, when the MCS updated at a particular time [time] is MCS_[time], the MCS updated at 31 seconds is MCS_31. Further, the MCSs updated at 33 seconds, 34 seconds, and 35 seconds, are MCS_33, MCS_34, and MCS_35, respectively, which are 0's. When the time 710 when the UE intends to determine a CWND for data transmission is 35.2 seconds, the MCS currently available to the UE is 0. That is, the UE is unable to know radio channel information available at the time 710 of 35.2 seconds.

Described below is an example in which the UE uses a radio channel value as last updated, which is not 0, when determining a CWND.

Referring to FIG. 7, the MCS is updated to MCS_32 at 32 seconds but not updated at 33 seconds and 34 seconds. Thus, when the time 710 when the UE intends to determine a CWND for data transmission is 35.2 seconds, the UE may use MCS_32 which is radio channel information 3 seconds before. When operated so, the MCS used for the UE to determine a CWND may show a significant difference from the UE's current actual radio channel according to the period/time when radio channel information is updated or when the idle period lacking data transmission is long. Upon shortening the period of updating radio channel information for reliability of MCS, a load may be applied when the computing block 610 reads radio channel information, such as MCS and nRB, out of the modem, and battery consumption may increase.

In the following, the UE may determine whether to use radio channel information as last updated, which is not 0, based on throughput autocorrelation as per time.

Figure 8:
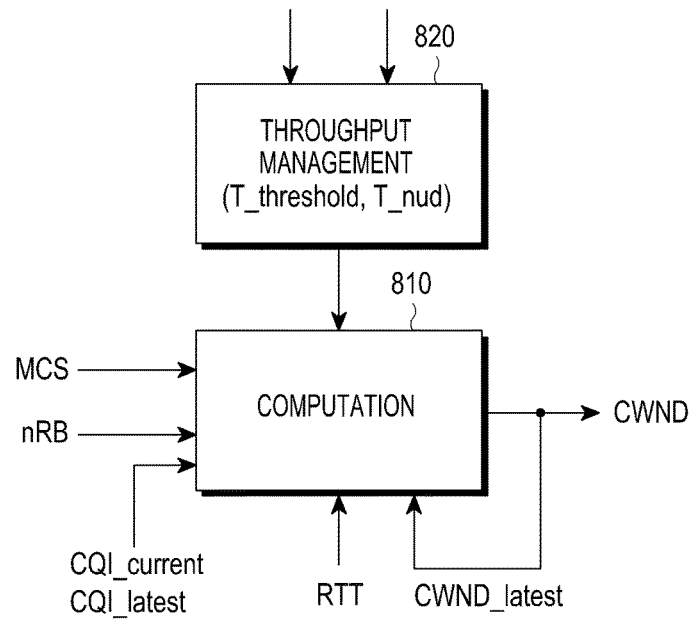
FIG. 8 illustrates an operation of determining a congestion window (CWND) considering a throughput autocorrelation according to an embodiment of the present disclosure.

FIG. 8 illustrates an operation of determining a CWND considering a throughput autocorrelation according to an embodiment of the present disclosure.

Referring to FIG. 8, a computing block 810 calculates a CWND in the same manner the computing block 610 of FIG. 6 does when a valid MCS and nRB are delivered from the modem of the UE. Meanwhile, a throughput managing block 820 is added to respond when failing to obtain the valid MCS and nRB. Like the computing block 810, the throughput managing block 820 may be implemented in the AP or another processor.

The throughput managing block 820 traces and manages the UE's throughput autocorrelation value and determines whether the MCS and nRB delivered from the modem are valid, i.e., whether the MCS and nRB are available for computing a CWND, based on the UE's throughput autocorrelation value. Here, the throughput autocorrelation value denotes a probability at which the UE is to maintain the current throughput.

Figure 9:
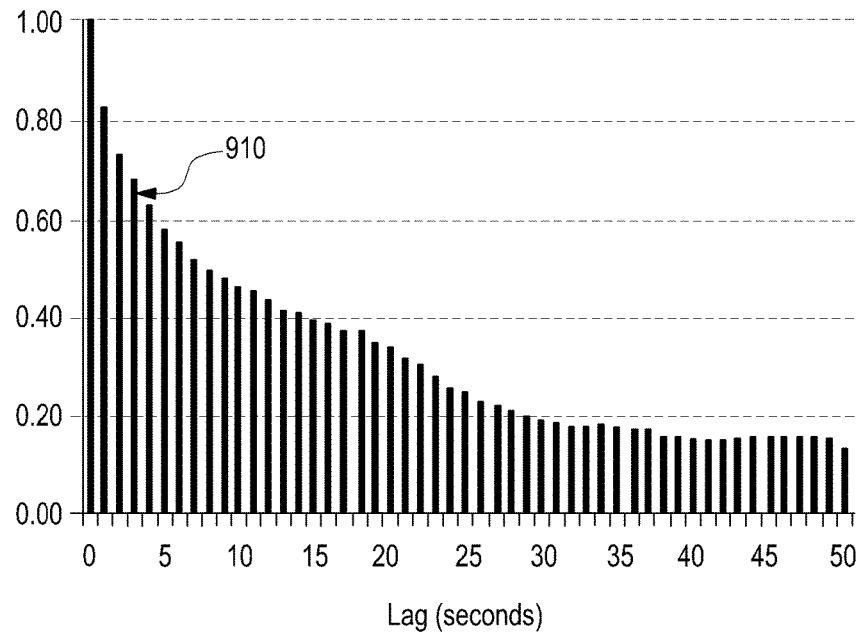
FIG. 9 illustrates per-time variations in throughput autocorrelation values in a UE according to an embodiment of the present disclosure.

FIG. 9 illustrates per-time variations in throughput autocorrelation values in a UE.

Referring to FIG. 9, the UE retains a throughput autocorrelation table including per-time throughput autocorrelation values as shown. Based on the table, the UE's throughput autocorrelation value, five seconds after a reference time, is 0.6. This means that, five seconds after the reference time, the UE has a 60% chance of maintaining the throughput for the reference time. Thus, the UE makes use of the throughput autocorrelation value as an index for determining whether the UE may use a MCS and nRB not being 0 and last received from the eNB in order to determine a CWND. That is, the actuator value becomes a reliability of MCS and nRB.

A maximum time when the UE's throughput autocorrelation value is not down to a predetermined value or less is denoted T_threshold. Referring to FIG. 9, the maximum time T_threshold, when the UE's throughput autocorrelation value remains not lower than 0.6 is 5 seconds. Further, a period during which radio channel information is not updated, i.e., the difference between the current time and the time when the radio channel information is last updated is denoted T_nud (time for NotUpdatedDuration). Referring to FIG. 7, at 35.2 seconds (710) when a CWND is intended to be determined after MCS_32, which is the last non-zero MCS, T_nud becomes 3 seconds (with the decimal removed or round off). (T_nud=35.2-32).

As set forth supra, the throughput managing block 820 determines T-threshold and identifies T_nud at the time when the CWND is intended to be determined.

Described below is an operation for the throughput managing block 820 to generate and manage a throughput autocorrelation table.

According to an embodiment of the present disclosure, the throughput managing block 820 may measure a throughput of the UE based on a time or position. According to an embodiment of the present disclosure, the UE's throughput may be measured, at least, regularly, during daytime, during a peak time, or at any time. According to an embodiment of the present disclosure, the UE's throughput may be measured, at least, for each cell/eNB, each tracking area (TA), or each geographical location. The UE may generate and update a throughput autocorrelation table based on the throughput measured so.

According to an embodiment of the present disclosure, the throughput managing block 820 obtains information regarding the throughput autocorrelation table from at least one nearby UE and updates throughput autocorrelation table based on the obtained information. The information from the nearby UE(s) may be obtained, e.g., through device-to-device (D2D) communication. The following is examples of D2D messages delivering the information on the throughput autocorrelation table.

Described below is an operation for the throughput managing block 820 to generate and manage a throughput autocorrelation table.

According to an embodiment of the present disclosure, the throughput managing block 820 may measure a throughput of the UE based on a time or position. According to an embodiment of the present disclosure, the UE's throughput may be measured, at least, regularly, during daytime, during a peak time, or at any time. According to an embodiment of the present disclosure, the UE's throughput may be measured, at least, for each cell/eNB, each tracking area (TA), or each geographical location. The UE may generate and update a throughput autocorrelation table based on the throughput measured so.

According to an embodiment of the present disclosure, the throughput managing block 820 obtains information regarding the throughput autocorrelation table from at least one nearby UE and updates the throughput autocorrelation table based on the obtained information. The information from the nearby UE(s) may be obtained, e.g., through device-to-device (D2D) communication. The following is examples of D2D messages delivering the information on the throughput autocorrelation table.

ThroughputAutocorrelation Information Broadcast (Throughput autocorrelation information)

ThroughputAutocorrelation Information Request/Response (Throughput autocorrelation information)

According to an embodiment of the present disclosure, UE 1 broadcasts ThroughputAutocorrelation Information Broadcast [Throughput autocorrelation information] which is a D2D broadcast message and includes throughput autocorrelation information indicating a throughput autocorrelation table in the message. UE 2 positioned around UE 1 may update the throughput autocorrelation table based on the message and may then carry and broadcast information on the updated throughput autocorrelation table on a D2D broadcast message.

According to an embodiment of the present disclosure, UE 1 sends ThroughputAutocorrelation Information Request, which is a D2D message, to the UE 1's nearby UE 2 to request throughput autocorrelation information. A UE 2 may send, to UE1, a D2D message carrying the UE 2's throughput autocorrelation information, which is ThroughputAutocorrelation Information Request [Throughput autocorrelation information], and UE 1 updates a throughput autocorrelation table based on the received message.

According to an embodiment of the present disclosure, the throughput managing block 820 sends information on the throughput measured by the UE (hereinafter, referred to as throughput information) to a server in charge of throughput management. The server generated and updates a throughput autocorrelation table based on the information received from the UE (and other UEs). The throughput autocorrelation table is transmitted from the server to the UE, and the UE stores the throughput autocorrelation table.

Table 6 below represents an exemplary throughput autocorrelation table including a fourth-generation (4G) enhanced cell global identifier (ECGI) ID, a TA identity (TAI), a geographical location, and per-time throughput autocorrelation values according to peak times.

TABLE 6

| T_nud | ECGI ID | TAI | Geographical location | Peak time |
|---|---|---|---|---|
| 100 ms | 0.99 | 0.98 | 0.99 | 0.98 |
| 200 ms | 0.98 | 0.96 | 0.98 | 0.96 |
| 300 ms | 0.95 | 0.96 | 0.95 | 0.96 |
| ... | ... | ... | ... | ... |

Here, ECGI ID means the identity of a cell where the UE is positioned in the LTE system, and TAI means a tracking area (TA) of the LTE system. Peak time is a time when the UE's radio traffic usage is a peak of the day, e.g., 18:00 to 20:00.

The throughput managing block 820 determines a reference throughput autocorrelation value and the throughput managing block 820's related T_threshold according to the current time or position based on information as set forth in Table 6.

The throughput managing block 820 compares the T_threshold determined above with T_nud and transfers a result to the computing block 810.

When T_nud<T_thresh, the computing block 810 determines a CWND using radio channel information (i.e., MCS) last updated and being not 0. In order to determine a CWND, the above-mentioned Equation 1 may be put to use according to an embodiment of the present disclosure.

When T_nud>=T_thresh, the computing block 810 determines that there are no valid MCS and nRB and determines a CWND using the CWND used latest, i.e., CWND_latest. According to an embodiment of the present disclosure, CWND_latest may be the CWND calculated latest or a CWND actually used for TCP communication. Further, the computing block 810 uses a variation in channel quality information (CQI) to reflect a variation in the radio channel state as well as time in determining a CWND. Here, CQI is information denoting a downlink channel state and may be measured for a downlink channel signal by the UE.

According to an embodiment of the present disclosure, when T_nud>=T_thresh, the UE applies the CQI variation and T_nud to the CWND_latest to determine a CWND as set forth in Equation 3:

$$CWND(t)=(CWND\_latest-CWND\_default)\exp\{-k(t-t\_latest)^3\}+CWND\_default$$

$$k=f\{CQI\}$$

If, $CQI\_current-CQI\_latest>0, f\{CQI\}$=increasing value or increasing function If, $CQI\_current-CQI\_latest>0, f\{CQI\}$=increasing value or increasing function          Equation 3

Based on Equation 3 above, a CWND is determined by applying a time difference and radio channel variation-applied weight to the difference between CWND_latest and CWND_default and adding CWND_default thereto.

Here, CWND_latest denotes the CWND used latest and finally.

CWND_default is a value arbitrarily set by the UE, e g, the initial CWND (e.g., 4MSS, 10MSS, etc.) determined by the TCP algorithm.

t_latest denotes the time when CWND_latest is determined.

k=f{CQI} means a CQI function.

When the current CQI (hereinafter referred to as CQI_current) is larger than the CQI measured latest (hereinafter, referred to as CQI_latest), the UE estimates that the radio channel state becomes better and determines f{CQI} as a value or function increasing according to the CQI (i e, an increasing value or increasing function).

When the current CQI (CQI_current) is not larger than the CQI measured latest (CQI_latest), the UE estimates that the radio channel state becomes worse and determines f{CQI} as a value or function decreasing according to the CQI (i.e., a decreasing value or decreasing function).

The values and parameters considered in Equation 3 may be replaced with other values/parameters depending on the UE's processing capability. For example, the exponential term multiplied to apply a weight to the difference between CWND_latest and CWND_default may be replaced by a second power term.

Figure 10:
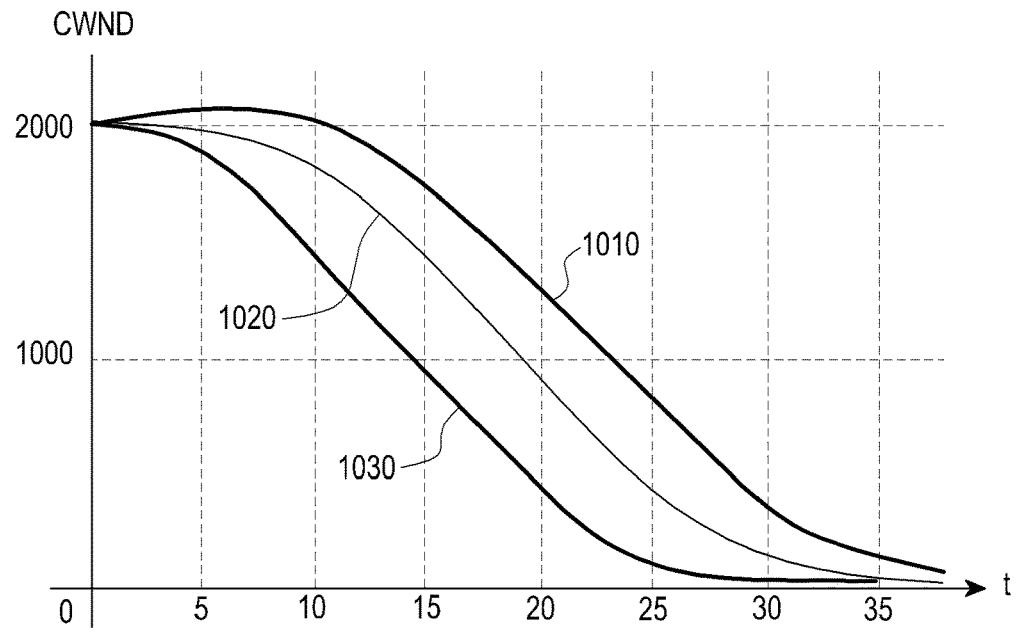
FIG. 10 illustrates examples of variations in a CWND to which an aging function is applied.

FIG. 10 illustrates variations in a CWND to which an aging function is applied.

Referring to FIG. 10, a first curve 1010 represents a CWND variation when CQI_current is larger than CQI_latest, showing that the CWND increases within a particular interval. A second curve 1020 and a third curve 1030 represent CWND variations when CQI_current is smaller than CQI_latest, showing that the CWND decreases over time.

The first curve 1010 is described in detail. When CQI_current is larger than CQI_latest, the CWND becomes a value larger than CWND_latest while T_nud is less than a particular time (e.g., less than 10 seconds). Unless T_nud is less than the particular time, however, although CQI_current is relatively large, no variation in the radio channel state is ensured, and the CWND thus becomes a value smaller than CWND_latest.

The second curve 1020 and third curve 1030 are described. When CQI_current is smaller than CQI_latest, the CWND reduces over time. According to an embodiment of the present disclosure, however, the CWND does not experience a sharp reduction to a small value (e.g., the initial CWND) as in the existing TCP protocol. Thus, it may be prevented from taking a long time for the CWND to increase to the maximum data rate after the data transmission idle mode.

Application of the Equation 3 algorithm may prevent a lowering in the data rate that arises upon uplink data transmission, but a load still exists when the application processor reads radio channel information such as MCS and nRB out of the modem. Therefore, a technique is required to determine a CWND upon failure to obtain valid radio channel information such as MCS and nRB or when the time of updating radio channel information exceeds a certain period of time.

Figure 11:
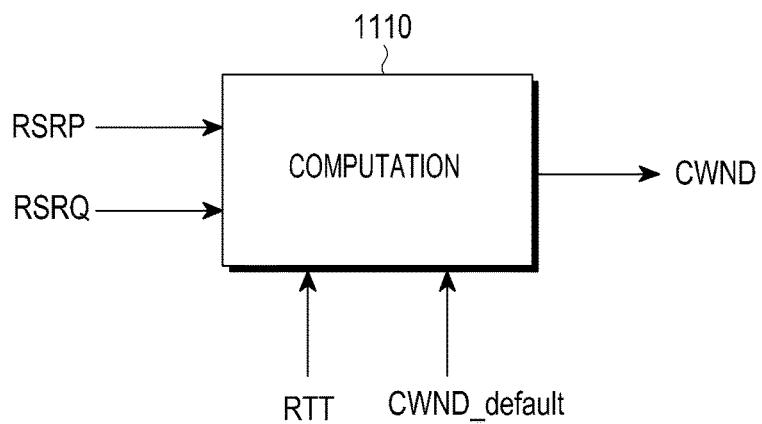
FIG. 11 illustrates an operation of determining a CWND considering a reception signal measurement according to an embodiment of the present disclosure.

FIG. 11 illustrates an operation of determining a CWND considering a reception signal measurement according to an embodiment of the present disclosure.

Referring to FIG. 11, a computing block 1110 estimates an uplink data rate based on reference signal received poser (RSRP) and reference signal received quality (RSRQ) obtained from a downlink signal and determines a CWND based on the uplink data rate. According to an embodiment of the present disclosure, such algorithm may be used when resource allocation information from the eNB, such as MCS and nRB, required to determine the radio channel state is absent or invalid. According to an embodiment of the present disclosure, the computing block 1110 distinguishes the position of the UE in the cell based on the RSRP and determines a CWND based on the RSRQ.

The RSRP is a link quality indicator, and the RSRP's value being smaller denotes a lower permissible transmission rate. The RSRQ denotes a power ratio and may be utilized as an index reflecting cell load and degree of interference. As an example, when the UE is equipped with an Android OS, the RSRP and RSRQ may be transferred from the modem or receiving circuit to the computing block 1110 in the application processor.

First, the computing block 1110 may compare the current RSRP (RSRP_current) with a predetermined threshold (RSRP_threshold) to determine whether the current area where the UE is currently positioned in the cell is under a strong or weak electric field. When determined to be under the weak electric field (i.e., RSRP_current <RSRP_threshold), the computing block 1110 predicts that the UE's uplink data rate is a particular value or less and determines that the CWND is a predetermined value to reduce the UE's processing load. According to an embodiment of the present disclosure, under the weak electric field, the CWND may be determined to be CWND_default which is a predetermined value. When determined to be under the strong electric field (i.e., RSRP_current>=RSRP_threshold), the computing block 1110 estimates the UE's uplink data rate using the RSRQ and determines a CWND based on the estimated uplink data rate. As above, when failing to secure radio channel information, such as MCS or nRB, the CWND may be determined using the RTT and RSRQ-based radio channel state estimation.

According to an embodiment of the present disclosure, RSRP_threshold may be determined by referencing the UE's handover parameter. That is, when the reference RSRP for handover as received by the UE from the eNB is −120 dBm, the UE may determine that RSRP_threshold is −120 dBm. Here, the reference RSRP may mean a reference value for determining that the UE needs a handover.

When determined to be under the weak electric field, the computing block 1110 regards the UE as being positioned on a cell boundary and determines that the CWND is CWND_default as predetermined. According to an embodiment of the present disclosure, CWND_default is an initial value as used in the existing TCP algorithm. According to an embodiment of the present disclosure, CWND_default may be determined based on a cell boundary-related value as set forth in Equation 4:

$$CWND\_default = \text{Cell Edge Target Throughput} * \text{Target Delay} \quad \text{Equation 4}$$

In Equation 4, Cell Edge target throughput is a value determined based on the data rate (data rate) supported at the cell boundary of the access network the UE uses, and this value is determined depending on the UE's access network. Target delay is the RTT of the network that the UE currently corns on, and this may be measured by the UE or received from a server.

When RSRP_current>=RSRP_threshold, the UE may determine a CWND as set forth in Equation 5:

$$CWND(t) = k * R(t) * S\_RTT(t)/MSS, k<1$$

$$R(t) = (1-a) * R(t-1) + a * f\{RSRQ\}, a<1 \quad \text{Equation (5)}$$

The computing block 1110 determines a CWND based on k*R(t), instead of MCS and nRB in Equation 1. k is a predetermined constant, and R(t) is an uplink data rate that the UE estimates based on the current RSRQ and past RSRQ at the time when the UE intends to determine the CWND. R(t−1) means an uplink data rate estimated in the past, (t−1). f{RSRQ} is a value related to the uplink data rate predicted based on the current RSRQ. According to an embodiment of the present disclosure, f{RSRQ} may be determined as TBS that may be maximally transmitted through the MCS mapped to the current RSRQ by referring to the mapping table between RSRQ and MCS retained in the UE.

S_RTT(t) may be the minimum RTT of the network under the assumption that no congestion occurs on the Internet link. Alternatively, S_RTT(t) may be a mean RTT within a predetermined interval. The minimum or mean RTT may be measured and stored by the UE.

Unlike cellular wireless communication where a UE receives resource allocations from an eNB and sends data, Wi-Fi communication utilizes contention-based resource allocation. That is, while a LTE communication UE calculates and estimates the amount of data (i.e., uplink data rate) that the UE may send on uplink based on the nRB assigned from an eNB and determines a CWND, a Wi-Fi communication UE cannot use such scheme because the UE does not use resources assigned from an eNB.

Thus, upon uplink data transmission through Wi-Fi communication, the UE infers the amount of resources that the UE may use depending on the current load of the access point (AP) where the UE is currently in connection and calculates the UE's available data rate. Further, the UE's maximum data rate is determined through the received signals strength.

Figure 12:
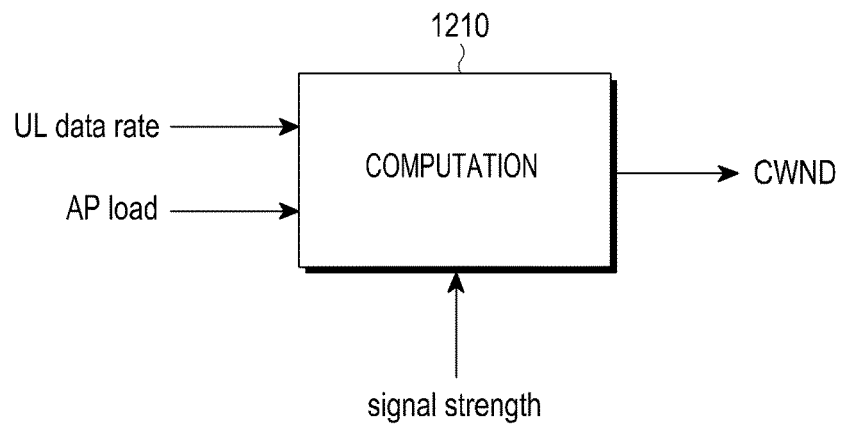
FIG. 12 illustrates an operation of determining a CWND on Wi-Fi communication according to an embodiment of the present disclosure.

FIG. 12 illustrates an operation of determining a CWND on Wi-Fi communication according to an embodiment of the present disclosure.

Referring to FIG. 12, the computing block 1210 calculates the UE's available data rate by reflecting an AP load and signal strength to an uplink data rate supported on Wi-Fi and determines a CWND based on the available data rate.

According to an embodiment of the present disclosure, the CWND may be calculated based on Equation 6:

$$CWND = \text{matrix}\{UL\ \text{data rate}, AP\ \text{load}, \text{signal strength}\} \quad \text{Equation 6}$$

As set forth above in Equation 6, a CWND on Wi-Fi communication is determined based on the UL data rate, AP load, and signal strength.

Now described are embodiments for determining the parameters used to calculate a CWND on Wi-Fi communication.

According to an embodiment of the present disclosure, the UL data rate (UL data rate) used for computing the CWND may be determined based on a MCS assigned for Wi-Fi communication. The computing block 1210 receives information on the MCS from a Wi-Fi modem (not shown) and calculates the uplink data rate using the MCS and pre-stored reference information. Here, the uplink data rate is calculated as the maximum data rate that may be supported through the MCS.

Table 7 below shows examples of the reference information available to calculate the uplink data rate of the UE.

TABLE 7

| MCS index | Spatial streams | Modulation type | Coding rate | Data rate (Mbit/s) | | | |
|---|---|---|---|---|---|---|---|
| | | | | 20 MHz channel | | 40 MHz channel | |
| | | | | 800 ns GI | 400 ns GI | 800 ns GI | 400 ns GI |
| 0 | 1 | BPSK | ½ | 6.5 | 7.2 | 13.5 | 15 |
| 1 | 1 | QPSK | ½ | 13 | 14.4 | 27 | 30 |
| 2 | 1 | QPSK | ¾ | 19.5 | 21.7 | 40.5 | 45 |
| 3 | 1 | 16-QAM | ½ | 26 | 28.9 | 54 | 60 |
| 4 | 1 | 16-QAM | ¾ | 39 | 43.3 | 81 | 90 |
| 5 | 1 | 64-QAM | ⅔ | 52 | 57.8 | 108 | 120 |
| 6 | 1 | 64-QAM | ¾ | 58.5 | 65 | 121.5 | 135 |
| 7 | 1 | 64-QAM | ⅚ | 65 | 72.2 | 135 | 150 |

TABLE 7-continued

| MCS index | Spatial streams | Modulation type | Coding rate | Data rate (Mbit/s) | | | |
|---|---|---|---|---|---|---|---|
| | | | | 20 MHz channel | | 40 MHz channel | |
| | | | | 800 ns GI | 400 ns GI | 800 ns GI | 400 ns GI |
| 8 | 2 | BPSK | ½ | 13 | 14.4 | 27 | 30 |
| 9 | 2 | QPSK | ½ | 26 | 28.9 | 54 | 60 |
| ... | ... | ... | ... | ... | ... | ... | ... |
| 28 | 4 | 16-QAM | ¾ | 156 | 173.2 | 324 | 360 |
| 29 | 4 | 64-QAM | ⅔ | 208 | 231.2 | 432 | 480 |
| 30 | 4 | 64-QAM | ¾ | 234 | 260 | 486 | 540 |
| 31 | 4 | 64-QAM | ⅚ | 260 | 288.8 | 540 | 600 |

Here, MCS index denotes the MCS used on Wi-Fi communication, Spatial streams means the number of streams subjected to spatial multiplexing, Modulation type means the modulation scheme as per the MCS, which may be binary phase shift keying (BPSK), quadrature PSK (QPSK), 16-ary quadrature amplitude modulation (16-QAM), or 64-ary QAM (64-QAM), and Coding rate denotes the modulation scheme according to the MCS. The computing block 1210 determines the UL data rate corresponding to the MCS index based on a table, e.g., Table 7 above.

As an example, when the MCS is 9, the UL data rate is determined to be 60 Mbit/sec which is the maximum data rate corresponding to MCS=9.

Alternatively, the UL data rate used to calculate a CWND may be determined as the UE's supported data rate. That is, the computing block 1210 obtains information regarding the data rate supported by the AP where the UE is in connection from the Wi-Fi modem, and the supported data rate becomes the UL data rate used to calculate the CWND. For example, the Wi-Fi modem may obtain the information on the supported data rate from the supported rate item in a beacon signal transmitted from the AP to the UE.

According to an embodiment of the present disclosure, the AP load used to calculate the CWND is obtained from information provided from the AP. That is, the AP includes an item, BSS (Basic Service Set) load, which is optional information, in the beacon signal transmitted to the UE. The UE may obtain the BSS load from the beacon signal received from the AP and calculate the AP load based on the BSS load. Specifically, the AP load is a value between 0 and 1, which is calculated based on the information in the BSS load received through the beacon signal from the AP, and this is denoted $\alpha$.

The BSS load may include a station count denoting the number of UEs connected to the AP, the AP's channel utilization (a value between 0 and 255), and the AP's available admission capacity. The AP load may be calculated based on the channel utilization included in the BSS load.

Equation 7 below represents an example of computing the AP load based on the channel utilization:

$$AP\ load = \alpha = f\{BSS\ load\} = channel\ utilization/255,$$
$$0 <= \alpha <= 1 \qquad \text{Equation 7}$$

From Equation 7 above, the AP load $\alpha$ is determined as a value obtained by dividing the received channel utilization value by 255. As $\alpha$ approaches 0, it means that the AP is less loaded, and coming close to 1 means that the AP is overloaded.

According to an embodiment of the present disclosure, the AP load used to calculate a CWND may be calculated based on a beacon interval instead of the information on the BSS load provided from the AP. By way of an example, upon failing to obtain the information on the BSS load from the AP, i.e., unless the beacon signal received from the AP contains the information on the BSS load, the UE refers to the beacon interval to calculate the AP load.

The beacon interval is mandatory information contained in the beacon signal and means the period of transmission of beacon signals from the AP to the UE. Typically, the beacon interval may be set to 100 ms.

The UE compares the beacon interval indicated by the parameters in the beacon signal received through the beacon signal at the time of determining the CWND (hereinafter, denoted "received beacon interval") with the interval between beacon signals that the UE actually receives (hereinafter, denoted "reported beacon interval") to estimate the AP load.

When received beacon interval<reported beacon interval, the UE estimates that the AP has a load. Further, when reported beacon interval is twice as large as received beacon interval or more, the UE determines that the AP has an average load or higher.

Equation 8 below represents an example of estimating the AP load based on the beacon interval:

if reported beacon interval<2*received beacon interval $\alpha$=(reported beacon interval−received beacon interval)/received beacon interval if reported beacon interval≥2*received beacon interval, $$\alpha = 1 \qquad \text{Equation 8}$$

According to an embodiment of the present disclosure, the signal strength used to calculate the CWND may be determined as follows.

The computing block 1210 obtains, from the Wi-Fi modem, information regarding a signal level indicating the result of measurement of a signal received from the AP The signal strength used to calculate the CWND is calculated based on the signal level, and this is denoted $\beta$ (a value between 0 and 1).

According to an embodiment of the present disclosure, the signal strength used to calculate the CWND is determined as one of strong electric field, medium electric field, and weak electric field. For example, when the signal level >−70 dBm, $\beta$ is determined to be 1 corresponding to the strong electric field. As another example, when the signal level <−120 dBm, $\beta$ is determined to be 0.1 corresponding to the weak electric field. Alternatively, $\beta$ may start with 1 and reduce in proportion to the signal level.

According to an embodiment of the present disclosure, based on the signal strength, AP load, and UL data rate determined by the UE, the computing block 1210 may determine the CWND as in Equation 9 given:

$$\begin{aligned} CWND &= \text{matrix}\{UL \text{ data rate}, AP \text{ load}, \text{signal strength}\} \quad \text{Equation 9} \\ &= UL \text{ data rate} * (1 - AP \text{ load}) * \text{signal strength} * RTT/MSS \\ &= UL \text{ data rate} * (1 - \alpha) * \beta * RTT/MSSS \end{aligned}$$

Referring to Equation 9, the computing block 1210 obtains the UE's available data rate by multiplying the UL data rate by $(1-\alpha)$, i.e., (1-AP load), followed by the signal strength. Further, the computing block 1210 multiplies the available data rate by the RTT to obtain the maximum amount of data that the UE may transmit through the TCP session and divides the maximum amount of data by the MSS to determine the CWND.

Figure 13:
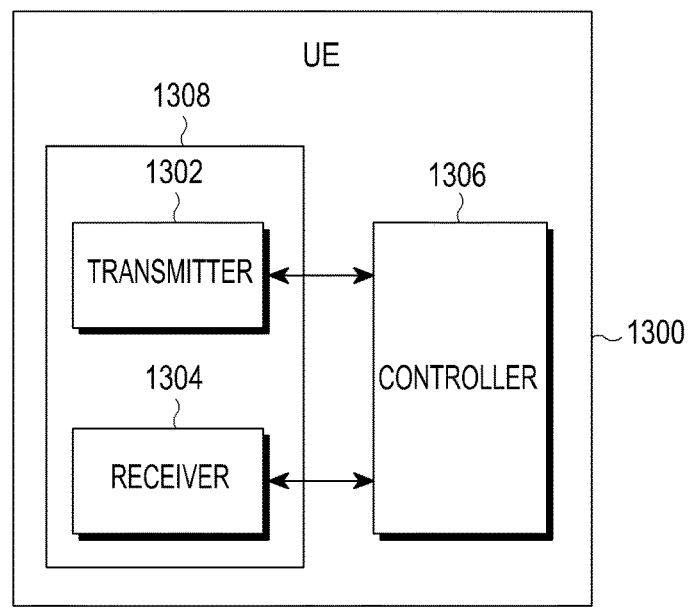
FIG. 13 illustrates a configuration of a UE adjusting a window size according to an embodiment of the present disclosure.

FIG. 13 illustrates a configuration of a UE adjusting a window size according to an embodiment of the present disclosure.

Referring to FIG. 13, the UE 1300 includes a modem 1308 and a controller 1306. A transmitter 1302 and a receiver 1304 included in the modem 1308 transmit or receive various signals and messages under the control of the controller 1306. The controller 1306 controls the overall operation of the UE 1300. In particular, the controller 1306 may include the above-described computing blocks 610, 810, and 1210 in order to perform the overall operation related to determination of a window size (CWND) according to an embodiment of the present disclosure.

Various embodiments of the present disclosure may be implemented in computer-readable codes on a computer-readable recording medium in particular points of view. The computer readable recording medium is a data storage device that may store data readable by a computer system. Examples of the computer readable recording medium may include read only memories (ROMs), random access memories (RAMs), compact disk-read only memories (CD-ROMs), magnetic tapes, floppy disks, optical data storage devices, and carrier waves (such as data transmission over the Internet). The computer readable recording medium may be distributed by computer systems over a network, and accordingly, the computer readable codes may be stored and executed in a distributed manner. Functional programs, codes, and code segments to attain various embodiments of the present disclosure may be readily interpreted by skilled programmers in the art to which the present disclosure pertains.

The apparatuses and methods according to embodiments of the present disclosure may be implemented in hardware, software, or a combination of hardware and software. Such software may be recorded in volatile or non-volatile storage devices, such as ROMs, memories, such as RAMs, memory chips, memory devices, or integrated circuit devices, compact disks (CDs), DVDs, magnetic disks, magnetic tapes, or other optical or magnetic storage devices while retained in machine (e.g., computer)-readable storage media. The methods according to embodiments of the present disclosure may be implemented by a computer or a portable terminal including a controller and a memory, and the memory may be an exemplary machine-readable storage medium that may properly retain program(s) containing instructions for implementing the embodiments of the present disclosure.

Accordingly, the present disclosure encompasses a program containing codes for implementing the device or method set forth in the claims of this disclosure and a machine (e.g., computer)-readable storage medium storing the program. The program may be electronically transferred via any media such as communication signals transmitted through a wired or wireless connection and the present disclosure properly includes the equivalents thereof.

The apparatuses according to embodiments of the present disclosure may receive the program from a program providing device wiredly or wirelessly connected thereto and store the same. The program providing apparatus may include a memory for storing a program including instructions enabling a program processing apparatus to perform a method according to an embodiment of the present disclosure and data necessary for a method according to an embodiment of the present disclosure, a communication unit for performing wired or wireless communication with a graphic processing apparatus, and a controller transmitting the program to the graphic processing apparatus automatically or as requested by the graphic processing apparatus.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for determining a window size in a wireless communication system, the method comprising:
   identifying a number of radio resource blocks (nRB) on a time-frequency domain and a modulation and coding scheme (MCS) assigned to a user equipment (UE) indicated by resource allocation information received from a base station, wherein the MCS is updated based on a throughput autocorrelation of the UE;
   determining an uplink data rate based on a transport block size (TBS) corresponding to the identified nRB and the MCS;
   determining whether a maximum transmission data size of an internet session including a wireless link between the UE and the base station is the window size for the internet session based on the uplink data rate; and
   in response to determining the window size for the internet session being equal to the maximum transmission data size of the internet session including the wireless link, transmitting uplink data through the internet session based on the determined window size.

2. The method of claim 1, further comprising:
   determining an index corresponding to an MCS level where the MCS assigned to the UE belongs by referring to information on a plurality of the MCS levels each of which includes at least one MCS; and
   determining the window size based on the index,
   wherein the window size is determined by adding a reference window size corresponding to the index to a difference between the MCS assigned to the UE and an MCS corresponding to the reference window size and a predetermined weight.

3. The method of claim 1, wherein determining the uplink data rate comprises determining the uplink data rate using radio channel information that is not set to 0 and updated last when a first value indicating a time taken for a throughput autocorrelation value of the UE to decrease a predetermined value is larger than a second value indicating a length of a period during which uplink radio channel information received from the base station is not updated.

4. The method of claim 1, further comprising determining the window size based on channel quality information (CQI) measured for a downlink when a first value indicating a time taken for a throughput autocorrelation value of the UE to decrease a predetermined value is not larger than a second value indicating a length of a period during which uplink radio channel information received from the base station is not updated.

5. The method of claim 1, further comprising determining the window size according to an equation when a first value indicating a time taken for a throughput autocorrelation value of the UE to decrease a predetermined value is not larger than a second value indicating a length of a period during which uplink radio channel information received from the base station is not updated, wherein the equation is given:

$$CWND(t)=(CWND\_latest-CWND\_default)\exp\{-k(t-t\_latest)^3\}+CWND\_default$$

$$k=f\{CQI\}$$

If, $CQI\_current-CQI\_latest>0, f\{CQI\}$=increasing function

If, $CQI\_current-CQI\_latest>0, f\{CQI\}$=decreasing function where CWND(t) means the window size at a time t, CWND_latest means the window size latest updated, CWND_default means a predetermined default window size, t_latest means a time when CWND_latest is determined, CQI_current means channel quality information (CQI) currently measured for a downlink, and CQI_latest means the CQI latest measured.

6. The method of claim 1, wherein when a current reference signal received power (RSRP) is not lower than a predetermined threshold, the window size is calculated according to an equation given:

$$CWND(t)=k*R(t)*S\_RTT(t)/MSS, k<1$$

$$R(t)=(1-a)*R(t-1)+a*f\{RSRQ\}, a<1$$

where CWND(t) means the window size at a time, k is a predetermined constant, R(t) is the uplink data rate estimated based on a current RSRQ and a past RSRQ, R(t−1) means the uplink data rate estimated in the past, f{RSRQ} is a value related to the uplink data rate predicted based on the current RSRQ, S_RTT(t) is a minimum round trip time (RTT) of the internet session, and MSS is a maximum transmission segment size of the internet session.

7. The method of claim 1, wherein determining the uplink data rate further comprises determining the uplink data rate based on at least one of a maximum data rate corresponding to an MCS used for the internet session and a data rate supported by an access point (AP) in which the UE accesses for the internet session.

8. The method of claim 1, wherein determining the window size further comprises computing the window size based on at least one of a signal strength measured by the UE, a load of an AP accessed by the UE for the internet session, or the uplink data rate, and
  wherein the load of the AP is calculated based on a channel utilization included in a basic service set (BSS) load in a beacon signal received from the AP, and
  wherein the load of the AP is estimated based on an interval between beacon signals received by the UE and a beacon interval received through a beacon signal from the AP at a time of determining the window size.

9. The method of claim 1, wherein the window size is calculated by an equation given:

$$\begin{aligned}CWND &= \text{matrix}\{UL \text{ data rate}, AP \text{ load}, \text{signal strength}\}\\ &= UL \text{ data rate}*(1-AP \text{ load})*\text{signal strength}*RTT/MSS\\ &= UL \text{ data rate}*(1-\alpha)*\beta*RTT/MSSS\end{aligned}$$

where CWND means the window size, UL data rate means the uplink data rate, AP load means a load of an AP accessed by the UE for the internet session, signal strength means a signal strength measured by the UE for a signal from the AP, RTT is a round trip time of the internet session, and MSS is a maximum segment size of the internet session.

10. An apparatus in a user equipment (UE) for determining a window size in a wireless communication system, the apparatus comprising:
  a controller configured to:
    identify a number of radio resource blocks (nRB) on a time-frequency domain and a modulation and coding scheme (MCS) assigned to the UE indicated by resource allocation information received from a base station, wherein the MCS is updated based on a throughput autocorrelation of the UE;
    determine an uplink data rate based on a transport block size (TBS) corresponding to the identified nRB and the MCS; and
    determine whether a maximum transmission data size of an internet session including a wireless link between the UE and the base station is the window size for the internet session based on the uplink data rate; and
  a transmitter operably connected to the controller, the transmitter configured to transmit uplink data through the internet session based on the determined window size, in response to determining the window size for the internet session being equal to the maximum transmission data size of the internet session including the wireless link.

11. The apparatus of claim 10, wherein the controller is further configured to:
  determine an index corresponding to an MCS level where the MCS assigned to the UE belongs by referring to information on a plurality of the MCS levels each of which includes at least one MCS; and
  determine the window size based on the index, wherein the window size is determined by adding a reference window size corresponding to the index to a difference between the MCS assigned to the UE and an MCS corresponding to the reference window size and a predetermined weight.

12. The apparatus of claim 10, wherein the controller is further configured to determine the uplink data rate using radio channel information that is not set to 0 and updated last when a first value indicating a time taken for a throughput autocorrelation value of the UE to decrease a predetermined value is larger than a second value indicating a length of a period during which uplink radio channel information received from the base station is not updated.

13. The apparatus of claim 10, wherein the controller is further configured to determine the window size based on channel quality information (CQI) measured for a downlink when a first value indicating a time taken for a throughput autocorrelation value of the UE to decrease a predetermined value is not larger than a second value indicating a length of a period during which uplink radio channel information received from the base station is not updated.

14. The apparatus of claim 10, wherein the controller is configured to determine the window size according to an equation when a first value indicating a time taken for a throughput autocorrelation value of the UE to decrease a predetermined value is not larger than a second value indicating a length of a period during which uplink radio channel information received from the base station is not updated, wherein the equation is given:

$$CWND(t)=(CWND\_latest-CWND\_default)\exp\{-k(t-t\_latest)^3\}+CWND\_default$$

$$k=f\{CQI\}$$

If, $CQI\_current-CQI\_latest>0, f\{CQI\}$=increasing function

If, $CQI\_current-CQI\_latest>0, f\{CQI\}$=decreasing function where CWND(t) means the window size at a time t, CWND_latest means the window size latest updated, CWND_default means a predetermined default window size, t_latest means a time when CWND_latest is determined, CQI_current means channel quality information (CQI) currently measured for a downlink, and CQI_latest means the CQI latest measured.

15. The apparatus of claim 10, wherein when a current reference signal received power (RSRP) is not lower than a predetermined threshold, the window size is calculated according to an equation given:

$$CWND(t)=k*R(t)*S\_RTT(t)/MSS, k<1$$

$$R(t)=(1-a)*R(t-1)+a*f\{RSRQ\}, a<1$$

where CWND(t) means the window size at a time, k is a predetermined constant, R(t) is the uplink data rate estimated based on a current RSRQ and a past RSRQ, R(t−1) means the uplink data rate estimated in the past, f{RSRQ} is a value related to the uplink data rate predicted based on the current RSRQ, S_RTT(t) is a minimum round trip time (RTT) of the internet session, and MSS is a maximum transmission segment size of the internet session.

16. The apparatus of claim 10, wherein the controller is further configured to determine the uplink data rate based on at least one of a maximum data rate corresponding to an MCS used for the internet session and a data rate supported by an access point (AP) in which the UE accesses for the internet session.

17. The apparatus of claim 10, wherein the controller is further configured to calculate the window size based on at least one of a signal strength measured by the UE, a load of an AP accessed by the UE for the internet session, or the uplink data rate, and wherein the load of the AP is calculated based on a channel utilization included in a basic service set (BSS) load in a beacon signal received from the AP, and wherein the load of the AP is estimated based on an interval between beacon signals received by the UE and a beacon interval received through a beacon signal from the AP at a time of determining the window size.

18. The apparatus of claim 10, wherein the window size is calculated by an equation given:

$$CWND = \text{matrix}\{UL \text{ data rate}, AP \text{ load}, \text{signal strength}\}$$
$$= UL \text{ data rate} * (1 - AP \text{ load}) * \text{signal strength} * RTT/MSS$$
$$= UL \text{ data rate} * (1 - \alpha) * \beta * RTT/MSSS$$

where CWND means the window size, UL data rate means the uplink data rate, AP load means a load of an AP accessed by the UE for the internet session, signal strength means a signal strength measured by the UE for a signal from the AP, RTT is a round trip time of the internet session, and MSS is a maximum segment size of the internet session.

* * * * *